United States Patent
Jang

(10) Patent No.: US 8,237,409 B2
(45) Date of Patent: Aug. 7, 2012

(54) PROTECTION CIRCUIT MODULE OF SECONDARY BATTERY AND SECONDARY BATTERY USING THE SAME

(75) Inventor: Youngcheol Jang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 558 days.

(21) Appl. No.: 12/236,819

(22) Filed: Sep. 24, 2008

(65) Prior Publication Data

US 2009/0086398 A1    Apr. 2, 2009

(30) Foreign Application Priority Data

Sep. 27, 2007 (KR) .................. 10-2007-97562

(51) Int. Cl.
H02J 7/00 (2006.01)
H01M 14/00 (2006.01)

(52) U.S. Cl. .......................... 320/134; 429/7

(58) Field of Classification Search .......... 320/134
See application file for complete search history.

(56) References Cited

U.S. PATENT DOCUMENTS

| | | | |
|---|---|---|---|
| 4,689,595 A * | 8/1987 | Jorgensen | 337/107 |
| 4,977,309 A * | 12/1990 | Uchida | 219/541 |
| 5,247,277 A | 9/1993 | Fang et al. | |
| 5,543,705 A * | 8/1996 | Uezono et al. | 323/369 |
| 5,691,688 A | 11/1997 | West et al. | |
| 5,777,541 A | 7/1998 | Vekeman | |
| 5,801,612 A | 9/1998 | Chandler et al. | |
| 6,025,771 A * | 2/2000 | Kobayashi et al. | 338/22 R |
| 6,088,234 A | 7/2000 | Ishikawa et al. | |
| 2002/0142195 A1 * | 10/2002 | Ehara | 429/7 |
| 2003/0157399 A1 | 8/2003 | Ikeuchi et al. | |
| 2006/0019160 A1 | 1/2006 | Han | |
| 2006/0044728 A1 | 3/2006 | Kim et al. | |
| 2006/0046139 A1 | 3/2006 | Suzuki et al. | |
| 2006/0251930 A1 * | 11/2006 | Kim | 429/7 |
| 2006/0263648 A1 * | 11/2006 | Park et al. | 429/7 |
| 2008/0116851 A1 * | 5/2008 | Mori | 320/134 |

FOREIGN PATENT DOCUMENTS

| | | |
|---|---|---|
| CN | 1941489 | 4/2007 |
| EP | 1 102 338 | 5/2001 |
| GB | 1 226 257 | 3/1971 |
| JP | 11-354305 | 12/1999 |

(Continued)

OTHER PUBLICATIONS

Patent Abstracts of Japan and English machine translation of Japanese Publication No. 2000-082603 listed above, 14 pages.

(Continued)

*Primary Examiner* — M'Baye Diao
(74) *Attorney, Agent, or Firm* — Christie, Parker & Hale, LLP

(57) ABSTRACT

A protective circuit module of a secondary battery and a secondary battery using the same, the protection circuit module including a positive temperature coefficient (PTC) device and a circuit board, wherein terminals of the PTC device are inserted into the circuit board to be coupled with connection terminals of the circuit board so that workability is improved and manufacturing costs are reduced. The secondary battery sensitively reacts to a temperature increase of the secondary battery by installing the PTC device on the upper or lower side of the circuit board, or extending one terminal of the PTC device to a bare cell of the secondary battery.

23 Claims, 7 Drawing Sheets

FOREIGN PATENT DOCUMENTS

| | | |
|---|---|---|
| JP | 2000-082603 | 3/2000 |
| JP | 2001-196202 | 7/2001 |
| JP | 2002-008608 | 1/2002 |
| JP | 2005-183176 | 7/2005 |
| JP | 2005-346945 | 12/2005 |
| JP | 2006-005377 | 1/2006 |
| JP | 2006-012823 | 1/2006 |
| JP | 2006-040893 | 2/2006 |
| JP | 2006-066090 | 3/2006 |
| JP | 2006-110087 | 4/2006 |
| JP | 2006-351386 | 12/2006 |
| KR | 10-2004-0043688 | 5/2004 |
| KR | 10-0686844 | 2/2007 |
| KR | 10-2007-0091880 | 9/2007 |
| KR | 10-0804893 | 2/2008 |
| WO | WO 2006/080790 A1 | 8/2006 |

OTHER PUBLICATIONS

Patent Abstracts of Japan and English machine translation of Japanese Publication No. 2001-196202 listed above, 9 pages.

Patent Abstracts of Japan and English machine translation of Japanese Publication No. 2006-005377 listed above, 18 pages.

English-language abstract of KR 10-2007-0012937.

English-language abstract of KR 10-2007-0081306.

Japanese Office action dated Nov. 1, 2011, for corresponding Japanese Patent application 2008-151844, noting listed references in this IDS, 3 pages.

Patent Abstracts of Japan, and English machine translation of Japanese Publication 2002-008608, listed above, 20 pages.

Patent Abstracts of Japan, and English machine translation of Japanese Publication 2005-183176, listed above, 8 pages.

Patent Abstracts of Japan, and English machine translation of Japanese Publication 2005-346945, listed above, 6 pages.

Patent Abstracts of Japan, and English machine translation of Japanese Publication 2006-040893, listed above, 10 pages, also corresponds to U.S. Publication 2006/0044728 listed above.

Patent Abstracts of Japan, and English machine translation of Japanese Publication 2006-110087, listed above, 8 pages.

\* cited by examiner

PROTECTION CIRCUIT MODULE OF SECONDARY BATTERY AND SECONDARY BATTERY USING THE SAME

CROSS-REFERENCE TO RELATED APPLICATION

This application claims the benefit of Korean Application No. 2007-97562, filed Sep. 27, 2007 in the Korean Intellectual Property Office, the disclosure of which is incorporated herein by reference.

BACKGROUND OF THE INVENTION

1. Field of the Invention

Aspects of the present invention relate to a secondary battery, and more particularly, to a protection circuit module of a secondary battery by which an assembling workability of the battery is enhanced and manufacturing costs can be reduced and a secondary battery using the same.

2. Description of the Related Art

Recently, secondary batteries have become widely employed in electronic products due to their rechargeability, small size, and large capacities. The secondary batteries are classified into various groups, including nickel hydrogen batteries, lithium batteries, lithium ion batteries, etc. The secondary battery is configured to include an electrode assembly and an electrolyte accommodated in a can, and electrode taps extended from electrode plates of the electrode assembly to connect to external terminals of a case. The electrode assembly includes a positive electrode plate and a negative electrode plate insulated from each other by a separator. Furthermore, in the secondary battery, a safety device (such as a positive temperature coefficient (PTC) device) is installed at a side of the secondary battery to prevent an accident such as explosion, burning, etc., from occurring due to an increase of an inner pressure when the secondary battery is exposed to a high temperature or a high voltage.

Specifically, the PTC device cuts off current when an electric device is exposed to high temperature. Although the PTC device is applied to various electronic devices, when employed in the battery, the PTC device plays a role of a safety device to prevent a battery from being exploded or burnt due to high temperature. The PTC device is made of a mixture of polymer and conductive material to be conductive. When the PTC is exposed to a high temperature such that the temperature of the PTC device is increased, the polymer expands and contacts between conductive particles are cut off so that resistance is suddenly increased to cut off the current.

For example, the PTC device installed in the secondary battery includes a PTC main body and conductive terminals connected to ends of the PTC main body. The PTC device is installed to an upper side or a lower side of a bare cell of the secondary battery. Furthermore, one terminal of the PTC device is connected to one electrode of the electrode assembly and the other terminal is connected to the external terminal via a protection circuit module. In this case, the terminals of the PTC device are electrically connected to the electrode terminals or the protection circuit module in a state of being connected to a lead plate. Accordingly, a conventional connecting structure between terminals for installation of the PTC device is complicated, and workability is thus inferior. Additionally, since the lead plate and an insulation material are required for the installation of the PTC device, a number of components are needed and manufacturing costs increase.

SUMMARY OF THE INVENTION

Aspects of the present invention provide a protection circuit board of a secondary battery in which a PTC device is installed by mounting the PTC device on the protection circuit board, thus improving workability.

Aspects of the present invention also provide a secondary battery in which a PTC device is installed to a protection circuit board to remove additional components required when the PTC device is installed to a bare cell, thus reducing manufacturing costs.

According to an aspect of the present invention, there is provided a protection circuit module of a secondary battery including: a positive temperature coefficient (PTC) device to cut off a current of the secondary battery according to a temperature; and a circuit board, wherein terminals of the PTC device are inserted into the circuit board to be coupled with connection terminals of the circuit board.

The terminals of the PTC device may contact the connection terminals.

The terminals of the PTC device may be soldered to the connection terminals.

The PTC device may include: a first terminal and a second terminal; and a PTC main body to electrically connect the first terminal and the second terminal.

The PTC main body may include a conductive polymer having a crystalline polymer resin and a conductive material.

The terminals of the PTC device may each include: a connection part connected to the PTC main body; and an insertion part inserted into the protection circuit board to be coupled with the corresponding connection terminal.

The connection part may be a flat plate, the insertion part may be bent at an end of the connection part, and an end of the insertion part may be perpendicularly inserted into a surface of the protection circuit module.

Moreover, the PTC main body and outer surfaces of the two terminals connected to the PTC main body may be coated with thermal insulation material and/or oxidation resistant material.

According to another aspect of the present invention, there is provided a secondary battery including: a bare cell including a can to accommodate an electrode assembly and an electrolyte and a cap assembly connected to an electrode of the electrode assembly to seal an opening of the can; and a protection circuit module electrically connected to the bare cell and including: a protection circuit board including an external terminal and connection terminals; and a positive temperature coefficient (PTC) device including terminals inserted into the protection circuit board and respectively connected to the connection terminals of the protection circuit board.

The terminals of the PTC device may contact the connection terminals.

The terminals of the PTC device may be soldered to the connection terminals.

The PTC device may include: a first terminal and a second terminal; and a PTC main body to electrically connect the first and second terminals together.

The PTC main body may include a conductive polymer having a crystalline polymer resin and a conductive material.

Each of the terminals of the PTC device may include a flat plate portion connected to the PTC main body, and a portion coupled with the corresponding connection terminal of the protection circuit board and perpendicularly inserted into a surface of the protection circuit board.

The PTC main body and outer surfaces of the two terminals connected to the PTC main body may be coated with thermal insulation material and/or oxidation resistant material.

The PTC device may be mounted to a surface of the protection circuit board facing the bare cell, or to a surface opposite to the surface of the protection circuit board facing the bare cell.

Moreover, a first terminal of the PTC device may extend to contact the bare cell.

The extended terminals of the PTC device may contact a negative electrode or a positive electrode of the bare cell.

According to still another aspect of the present invention, there is provided a positive temperature coefficient (PTC) device of a secondary battery including a protection circuit board, the PTC device including: a first terminal connected to an electrode of the secondary battery through a first connection terminal of the protection circuit board; a second terminal connected to an external terminal through a second connection terminal of the protection circuit board; and a main body to electrically connect the first terminal and the second terminal together.

According to yet another aspect of the present invention, there is provided a protection circuit board of a secondary battery including a positive temperature coefficient (PTC) device, the protection circuit board including: an external terminal; a first connection terminal to connect a first terminal of the PTC device to an electrode of the secondary battery; and a second connection terminal to connect a second terminal of the PTC device to the external terminal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
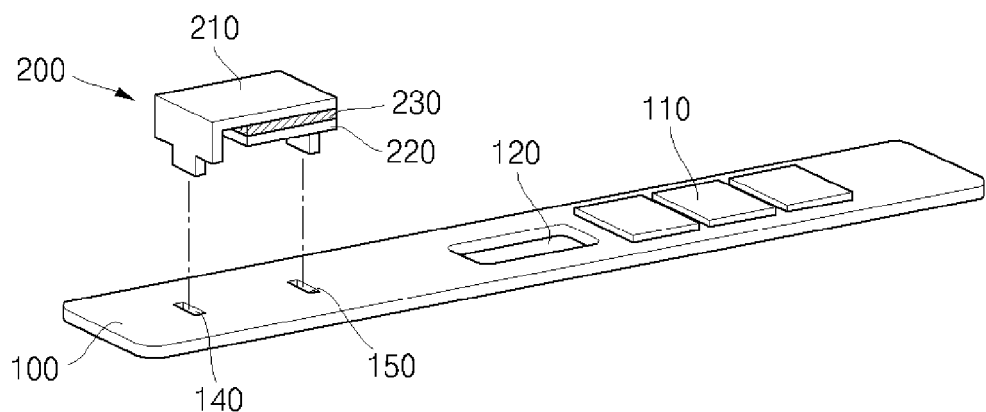
FIG. 1 is a perspective view illustrating a protection circuit module of a secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
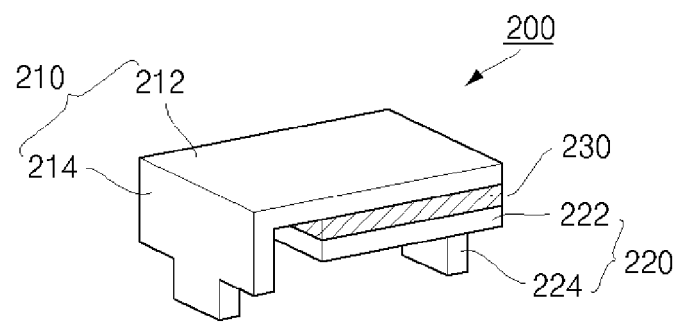
FIG. 2 is a perspective view illustrating a positive temperature coefficient (PTC) device according to an embodiment of the present invention.
Figure 3:
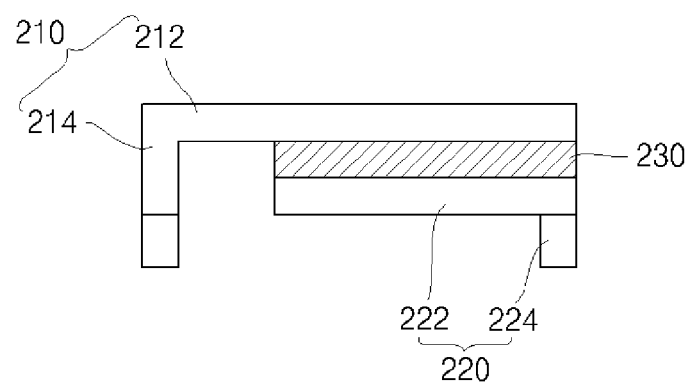
FIG. 3 is a front view illustrating the PTC device in FIG. 2.
Figure 4:
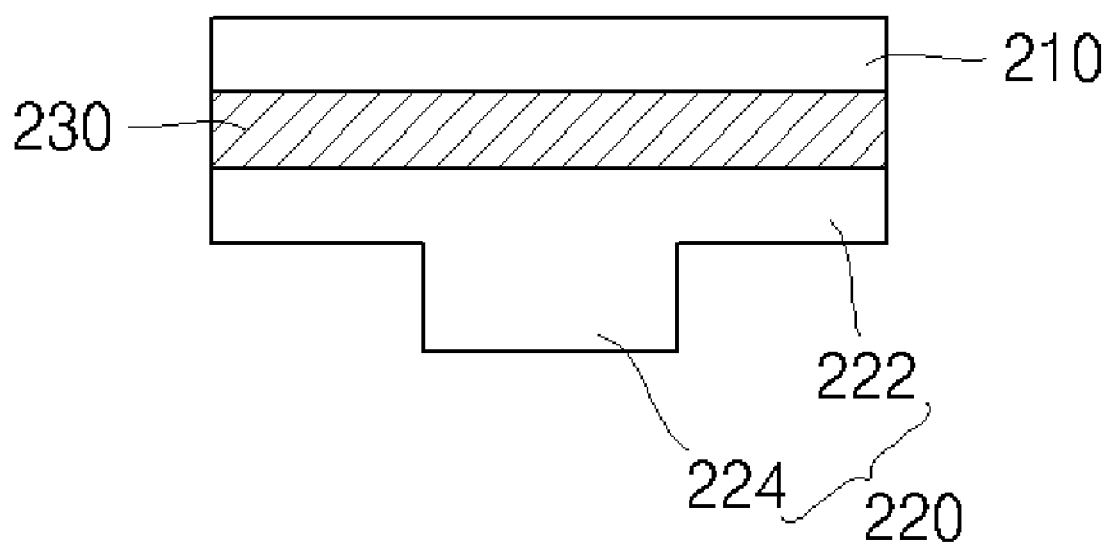
FIG. 4 is a side view illustrating the PTC device in FIG. 2.

FIG. 1 is a perspective view illustrating a protection circuit module of a secondary battery according to an embodiment of the present invention. FIGS. 2 through 4 are a perspective view, a front view, and a side view, respectively, illustrating a positive temperature coefficient (PTC) device according to the embodiment of the present invention.

Referring to FIGS. 1 to 4, a protection circuit module of a secondary battery includes a protection circuit board 100 having connection terminals 140 and 150 and a positive temperature coefficient (PTC) device 200 connected to the connection terminals 140 and 150.

The protection circuit board 100 includes external terminals 110 installed on a surface of the protection circuit board 100, a through-hole 120 formed at or approximately at the center of the protection circuit board 100, and the connection terminals 140 and 150 provided at a side opposite to the side where the external terminals 110 are installed.

The PTC device 200 includes a first terminal 210 connected to a positive electrode or a negative electrode through the connection terminal 140 of the protection circuit board 100, a second terminal 220 connected to the external terminals 110 through the connection terminal 150 of the protection circuit board 100, and a PTC main body 230 between the first and second terminals 210 and 220.

The first and second terminals 210 and 220 are made of conductive material. Furthermore, the first and second terminals 210 and 220 include connection parts 212 and 222 connected to the PTC main body 230 and insertion parts 214 and 224 connected to the connection terminals 140 and 150 of the protection circuit board 100. The connection parts 212 and 222 may be flat plates that contact surfaces of the PTC main body 230. The insertion parts 214 and 224 are vertically bent at ends of the connection parts 212 and 222 (for example, perpendicularly to the connection parts 212 and 222). Accordingly, the insertion parts 214 and 224 are inserted through the surface of the protection circuit board 100 in a direction perpendicular to the surface of the protection circuit board 100.

The first terminal 210, which has a 90-degree rotated 'L'-shape, is attached to a side of the PTC main body 230 (for example, an upper side) and is perpendicularly bent toward the surface of the protection circuit board 100 at a distance from the surface. Moreover, the second terminal 220, which has a reversed 'L-'shape, is attached to another side of the PTC main body 230 (for example, a lower side) and is perpendicularly bent toward the surface of the protection circuit board 100 at the surface of the protection circuit board 100.

The PTC main body 230 is made of conductive polymer including a mixture of crystalline polymer resin and a conductive material (such as carbon black, metal particles, and metal powder). Furthermore, the PTC main body 230 has a flat cubic shape. However, it is understood that the PTC main body 230 is not limited to the flat cubic shape. For example, the PTC main body 230 may have a flat cylindrical shape.

An outer surface of the PTC main body 230 or a portion of the outer surface connected to the two terminals 210 and 220 may be coated with thermal insulation material. As such, heat absorbed from the PTC main body 230 is not emitted to the exterior.

Moreover, an outer surface of the PTC main body 230 or a portion of the outer surface connected to the two terminals 210 and 220 may be coated with oxidation resistance material to prevent the PTC main body 230 from being oxidized.

The protection circuit module to which the PTC device 200 according to the illustrated embodiment of the present invention is mounted is simply completed by inserting the two terminals 210 and 220 into the protection circuit board 100 during the installation of the PTC device 200. Accordingly, the installation of the PTC device 200 is significantly simplified and improved. Moreover, the portions of the PTC device 200 inserted into the protection circuit board 100 can be stably fixed to the circuit board 100 by soldering.

Figure 5:
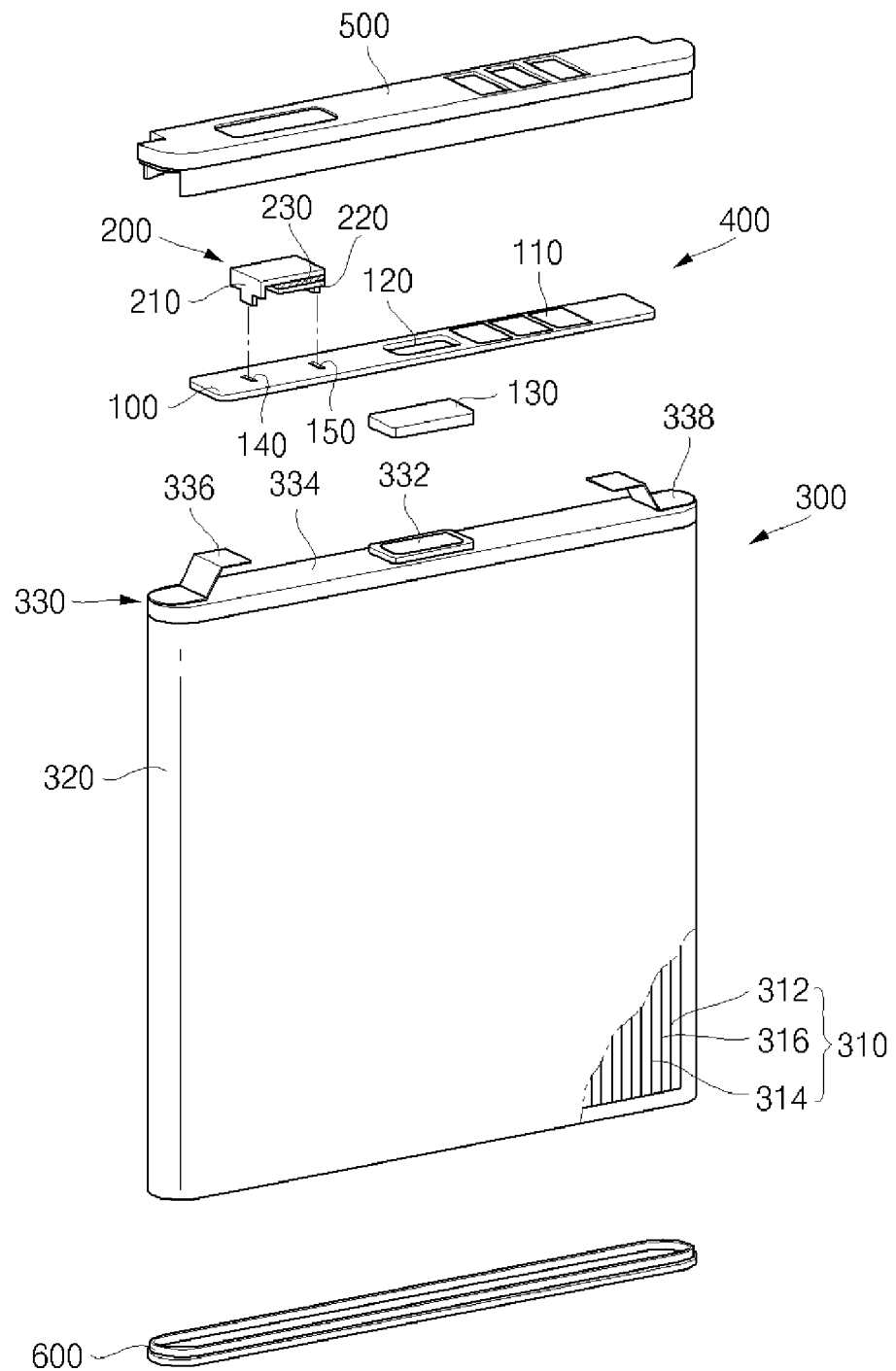
FIG. 5 is an exploded perspective view illustrating a secondary battery using a protection circuit module according to an embodiment of the present invention.

FIG. 5 is an exploded perspective view illustrating a secondary battery using the protection circuit module according to an embodiment of the present invention. Referring to FIG. 5, the secondary battery includes a bare cell 300, a protection circuit module 400 electrically connected to the bare cell 300, and upper and lower cases 500 and 600 respectively coupled with the upper and lower sides of the bare cell 300. The protection circuit module 400 includes the protection circuit board 100 with the external terminals 110 illustrated in FIG. 1.

The bare cell 300 includes an electrode assembly 310 having a positive electrode plate 312, a negative electrode plate 314, and a separator 316, a can 320 to accommodate the electrode assembly 310 and an electrolyte, and a cap assembly 330 sealing an opening of the can 320 and including a cap plate 334 to which an electrode terminal 332 is connected to the electrode assembly 310.

The electrode terminal 332 may be a negative electrode terminal, or a positive electrode terminal having a changed positive polarity. Moreover, lead plates 336 and 338 are installed to both upper ends of the cap plate 334 in order to be electrically connected to the protection circuit board 100 and to support the protection circuit board 100 parallel to the upper side of the bare cell 300.

An electric terminal 130 connected to the electrode terminal 332 of the bare cell 300 is passed (for example, welded) through the through-hole 120 of the protection circuit board. Furthermore, the protection circuit module 400 may include various protection circuit components (not shown) and a safety device that are installed to a side of the protection circuit module 400.

As illustrated, the secondary battery includes the protection circuit board 100 to which the PTC device 200 is mounted. In other words, the PTC device 200 is installed to the protection circuit board 100 by inserting the two terminals 210 and 220 into the protection circuit board 100.

Since the PTC device 200, as described with reference to FIGS. 1 through 4, has the same structure as that employed in the protection circuit board 100 of a secondary battery according to aspects of the present invention, a detailed description thereof will be omitted.

As such, the first and second terminals 210 and 220 of the PTC device 200 that is mounted to the upper side of the protection circuit board 100 are electrically connected to the connection terminals 140 and 150, respectively, of the protection circuit board 100.

Therefore, the bare cell 300 of the secondary battery is assembled by accommodating the electrode assembly 310 in the can 320, sealing the opening of the can 320 with the cap assembly 330, injecting the electrolyte, and sealing the bare cell 300. Furthermore, the protection circuit board 100 to which the PTC device 200 is mounted is fixed to the upper side of the bare cell 300 to couple the upper case 500 with the lower case 600.

Figure 6:
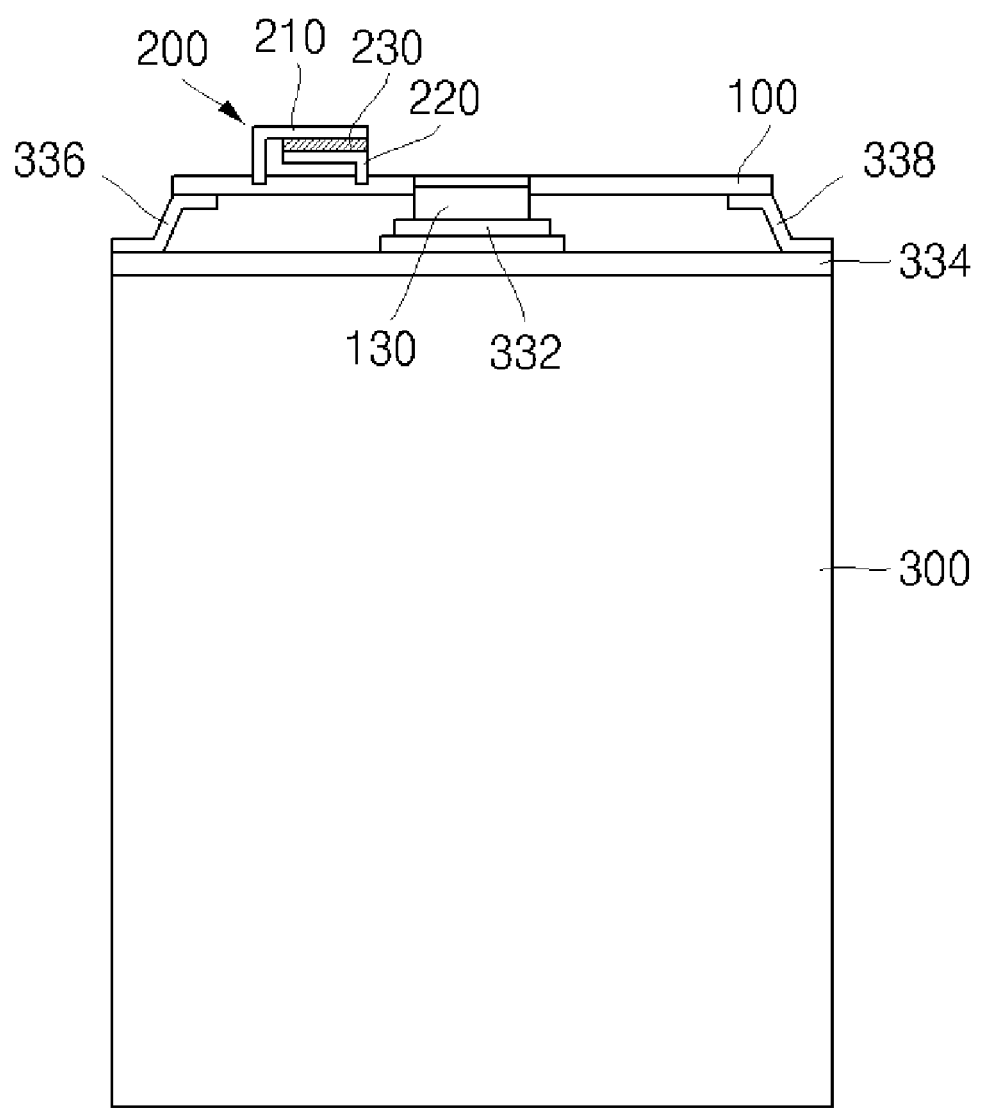
FIG. 6 is a sectional view illustrating an assembly of the secondary battery in FIG. 5.

FIG. 6 is a sectional view illustrating a secondary battery according to an embodiment of the present invention prior to the coupling of the upper and lower cases. Referring to FIG. 6, the secondary battery includes the PTC device 200 mounted on the upper side of the protection circuit board 100. The two terminals 210 and 220 of the PTC device 200 are connected to the connection terminals 140 and 150 of the protection circuit board 100. And the protection circuit board 100 is connected to electrode 332 and lead plate 336 and 338 of the bare cell 300.

In the secondary battery according to aspects of the present invention, a temperature of the PTC device 200 increases due to high temperature generated from the battery when an electric current of the secondary battery increases. Therefore, the temperature of the PTC main body 230 increases, the polymer particles contained in the conductive material are expanded so that contacts between the conductive particles are cut off, and the current is also cut off. As such, explosion and burning of the battery can be prevented due to the PTC device 200 installed on the protection circuit board 100.

Figure 7:
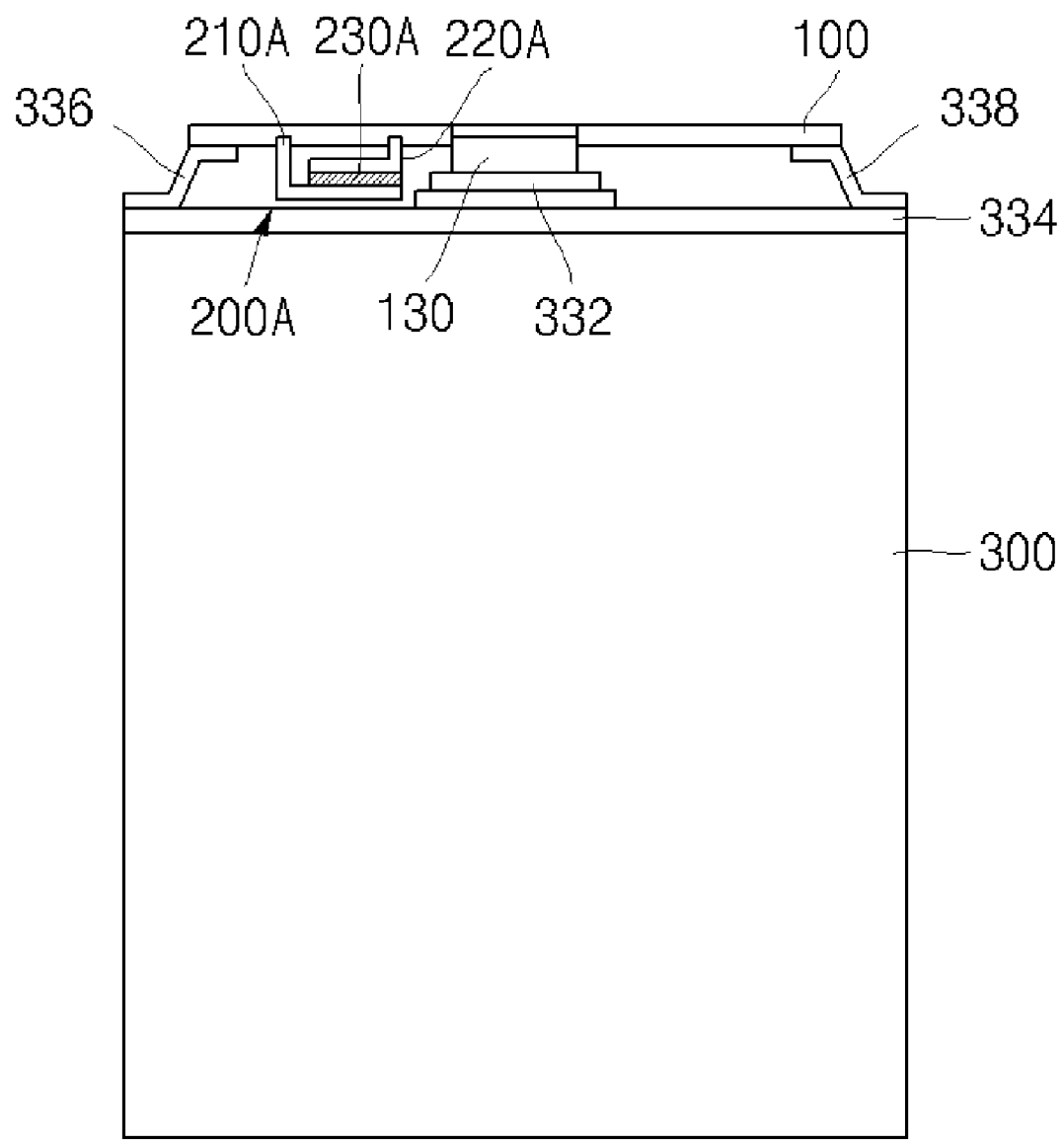
FIG. 7 is a sectional view illustrating an assembly of a secondary battery according to another embodiment of the present invention.

FIG. 7 is a sectional view illustrating a secondary battery according to another embodiment of the present invention prior to the coupling of upper and lower cases. Referring to FIG. 7, the secondary battery includes the PTC device 200A mounted on the protection circuit board 100. The two terminals 210A and 220A of the PTC device 200A are connected to the connection terminals 140 and 150 of the protection circuit board 100. And the protection circuit board 100 is connected to electrode 332 and lead plate 336 and 338 of the bare cell 300.

The difference between the secondary battery illustrated in FIG. 7 and the secondary battery illustrated in FIG. 6 is in the location of the PTC device 200 relative to the protection circuit board 100. Specifically, while the PTC device 200 is located on an upper side of the protection circuit board 100 in FIG. 6, the PTC device 200A is located on a lower side of the protection circuit board 100 in FIG. 7. Therefore, the PTC main body 230A of the PTC device 200A is positioned at the lower side of the protection circuit board 100 very close to the bare cell 300.

As such, since the PTC device 200A is installed close to the bare cell 300 in the secondary battery, the secondary battery can react to the temperature change more sensitively, thus improving the performance of the PTC device 200A as a safety device to interrupt the current according to the voltage change of the secondary battery.

Figure 8:
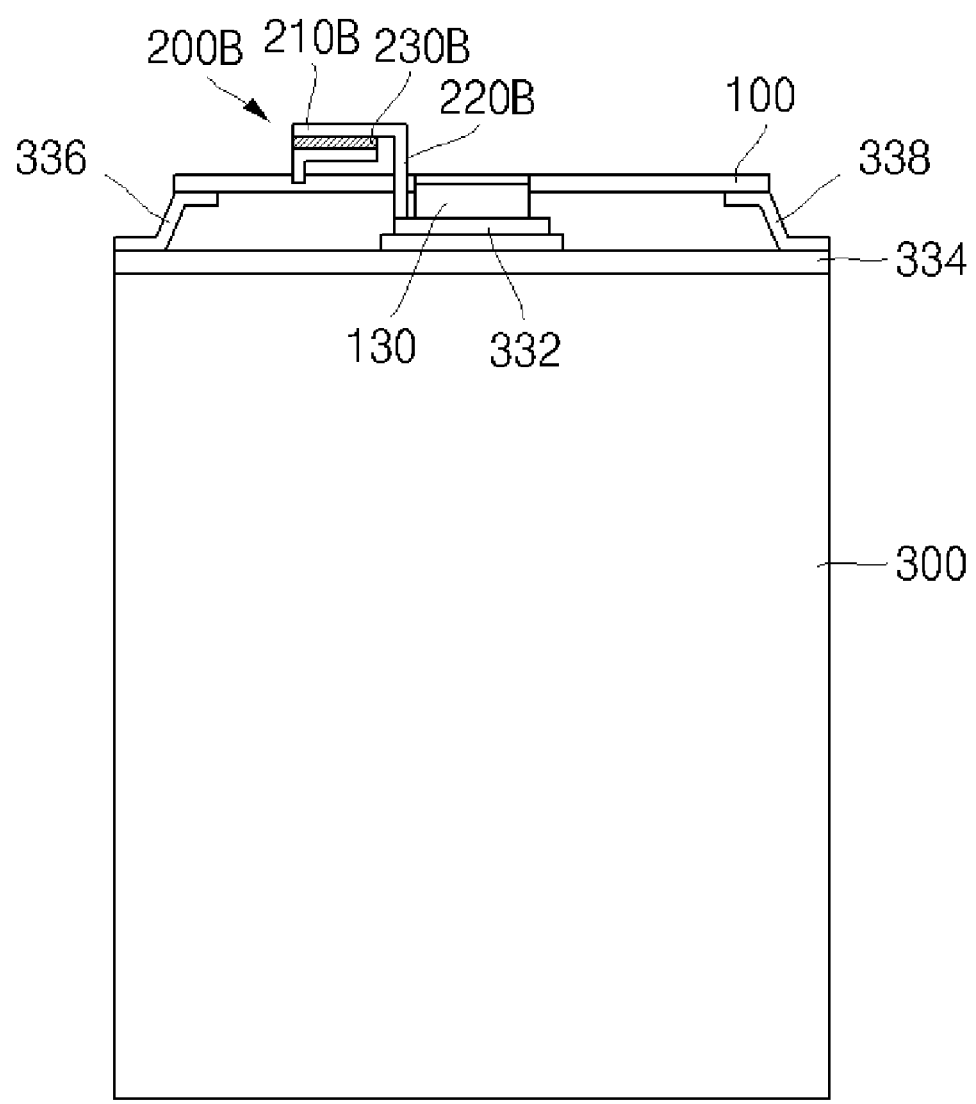
FIG. 8 is a sectional view illustrating an assembly of a secondary battery according to still another embodiment of the present invention.
Figure 9:
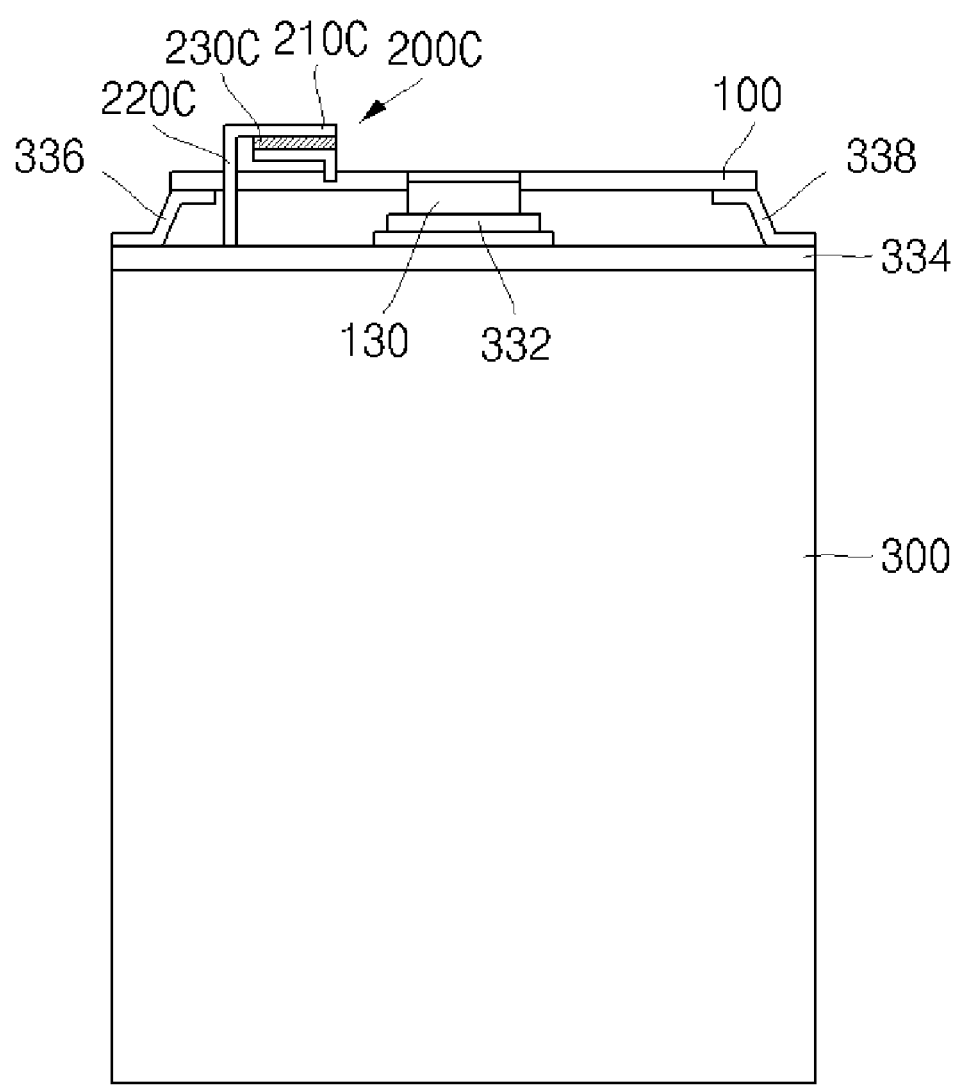
FIG. 9 is a sectional view illustrating an assembly of a secondary battery according to still another embodiment of the present invention.

FIGS. 8 and 9 are sectional views illustrating a secondary battery according to still another embodiment of the present invention prior to the coupling of upper and lower cases. Referring to FIGS. 8 and 9, the secondary battery includes a PTC device 200B and 200C installed to an upper side of the protection circuit board 100. One of first and second terminals 210B and 210C and 220B and 220C connected to a PTC main body 230B and 230C of the PTC device 200B and 200C extends by a length to penetrate the protection circuit board 100 and connect to the upper side of the bare cell 300.

As illustrated in FIG. 8, the first terminal 210B of the terminals 210B and 220B of the PTC device 200B extends to the electrode terminal 332 of the bare cell 300. Specifically, the first terminal 210B of the PTC device 200B is connected to the negative electrode of the bare cell 300 and the second terminal 220B is connected to an external terminal (not shown) of the protection circuit board 100.

As illustrated in FIG. 9, a second terminal 220C of first and second terminals 210C and 220C of a PTC device 200C extends to the cap plate 334 of the bare cell 300. Specifically, the second terminal 220C of the PTC device 200C is connected to the positive electrode of the bare cell 300 and the first terminal 210C is connected to an external terminal (not shown) of the protection circuit board 100

As such, the terminal 210B and 220C of the PTC device 200B and 220C extends sufficiently to connect to the upper side of the bare cell 300 so that the PTC main body 230B and 230C rapidly detects the temperature change of the bare cell 300 to cut off the current.

As described above, in a protection circuit module of a secondary battery according to aspects of the present invention, a PTC device 200 is installed to a protection circuit board 100 so that the workability is improved. In particular, the PTC device 200 is installed to the protection circuit board 100 so that additional components are not required when the PTC device 200 is installed to the bare cell of the secondary battery. Accordingly, manufacturing costs can be reduced.

Furthermore, in a case when the PTC device 200 is installed to the lower side of the protection circuit board in the secondary battery, the temperature change of the bare cell can be more sensitively detected.

Moreover, in a case when one terminal 210B and 220C of the PTC device 200B and 220C installed to the protection circuit board 100 extends by a distance sufficient to connect to the bare cell, thermal conductivity in which heat of the bare cell is transferred to the PTC device 200B and 220C is improved so that the current cut off performance of the PTC device 200B and 220C can be improved.

Although a few embodiments of the present invention have been shown and described, it would be appreciated by those skilled in the art that changes might be made in this embodiment without departing from the principles and spirit of the invention, the scope of which is defined in the claims and their equivalents.

What is claimed is:

1. A protection circuit module of a secondary battery comprising:
   a positive temperature coefficient (PTC) device to cut off a current of the secondary battery; and
   a circuit board,
   wherein terminals of the PTC device are inserted into the circuit board to be coupled with connection terminals of the circuit board.

2. The protection circuit module as claimed in claim 1, wherein the terminals of the PTC device contact the connection terminals.

3. The protection circuit module as claimed in claim 2, wherein the terminals of the PTC device are soldered to the connection terminals of the circuit board.

4. The protection circuit module as claimed in claim 1, wherein the PTC device comprises:
   a PTC main body,
   wherein the terminals of the PTC device comprise a first terminal and a second terminal electrically connected to the PTC main body.

5. The protection circuit module as claimed in claim 4, wherein the PTC main body includes a conductive polymer having a crystalline polymer resin and a conductive material.

6. The protection circuit module as claimed in claim 4, wherein the first and second terminals of the PTC device each comprises:
   a connection part connected to the PTC main body; and
   an insertion part inserted into the circuit board to be coupled with a corresponding connection terminal.

7. The protection circuit module as claimed in claim 6, wherein each connection part is a flat plate, and each insertion part is bent at an end of the corresponding connection part.

8. The protection circuit module as claimed in claim 7, wherein an end of the insertion part is perpendicularly inserted into a surface of the circuit board.

9. The protection circuit module as claimed in claim 4, wherein the PTC main body and outer surfaces of the first and second terminals connected to the PTC main body are coated with thermal insulation material and/or oxidation resistant material.

10. The protection circuit module as claimed in claim 4, wherein the first terminal extends through the circuit board and contacts a bare cell of the secondary battery.

11. The protection circuit module as claimed in claim 4, wherein:
   the first terminal is connected to an electrode of the secondary battery through a first conductive connection terminal of the connection terminals of the circuit board; and
   the second terminal is connected to an external terminal through a conductive second connection terminal of the connection terminals of the circuit board.

12. A secondary battery comprising:
   a bare cell including a can to accommodate an electrode assembly and an electrolyte and a cap assembly connected to an electrode of the electrode assembly to seal an opening of the can; and
   a protection circuit module electrically connected to the bare cell, the protection circuit module comprising:
   a protection circuit board including an external terminal and connection terminals; and
   a positive temperature coefficient (PTC) device to cut off a current of the secondary battery, the PTC device including terminals inserted into the protection circuit board and respectively coupled with the connection terminals of the protection circuit board.

13. The secondary battery as claimed in claim 12, wherein the terminals of the PTC device contact the connection terminals.

14. The secondary battery as claimed in claim 13, wherein the terminals of the PTC device are soldered to the connection terminals of the protection circuit board.

15. The secondary battery as claimed in claim 12, wherein the PTC device comprises:
   a PTC main body,
   wherein the terminals of the PCT device comprise a first terminal and a second terminal electrically connected to the PTC main body.

16. The secondary battery as claimed in claim 15, wherein the PTC main body includes a conductive polymer having a crystalline polymer resin and a conductive material.

17. The secondary battery as claimed in claim 15, wherein the first and second terminals of the PTC device each comprises:
   a connection part that is a flat plate connected to the PTC main body; and
   an insertion part coupled with a corresponding connection terminal of the protection circuit board and perpendicularly inserted into a surface of the protection circuit board.

18. The secondary battery as claimed in claim 15, wherein the PTC main body and outer surfaces of the first and second terminals connected to the PTC main body are coated with thermal insulation material and/or oxidation resistant material.

19. The secondary battery as claimed in claim 12, wherein the PTC device is mounted to a surface of the protection circuit board facing the bare cell.

20. The secondary battery as claimed in claim 12, wherein the PTC device is mounted to a surface opposite to a surface of the protection circuit board facing the bare cell.

21. The secondary battery as claimed in claim 15, wherein the first terminal of the PTC device extends through the protection circuit board and contacts the bare cell.

22. The secondary battery as claimed in claim 21, wherein the first terminal of the PTC device contacts a negative electrode or a positive electrode of the bare cell.

23. The secondary battery as claimed in claim 15, wherein:
- the first terminal is connected to an electrode of the electrode assembly through a first conductive connection terminal of the connection terminals of the protection circuit board; and
- the second terminal is connected to the external terminal through a second connection terminal of the protection circuit board.

* * * * *

UNITED STATES PATENT AND TRADEMARK OFFICE
CERTIFICATE OF CORRECTION

PATENT NO.         : 8,237,409 B2
APPLICATION NO.    : 12/236819
DATED              : August 7, 2012
INVENTOR(S)        : Youngcheol Jang Page 1 of 1

It is certified that error appears in the above-identified patent and that said Letters Patent is hereby corrected as shown below:

In the Claims

| | |
|---|---|
| Column 8, Claim 11, line 10 | Delete "first conductive connection"<br>Insert -- conductive first connection -- |
| Column 8, Claim 15, line 39 | Delete "PCT"<br>Insert -- PTC -- |
| Column 9, Claim 23, line 6 | Delete "first conductive connection"<br>Insert -- conductive first connection -- |
| Column 10, Claim 23, line 4 | Before "second"<br>Insert -- conductive -- |
| Column 10, Claim 23, line 4 | After "terminal"<br>Insert -- of the connection terminals -- |

Signed and Sealed this
Fourth Day of March, 2014

Michelle K. Lee
*Deputy Director of the United States Patent and Trademark Office*